US 11,971,531 B2

(12) United States Patent
Weiss et al.

(10) Patent No.: US 11,971,531 B2
(45) Date of Patent: Apr. 30, 2024

(54) METHOD AND MICROSCOPE FOR DETERMINING THE THICKNESS OF A COVER SLIP OR SLIDE

(71) Applicant: LEICA MICROSYSTEMS CMS GMBH, Wetzlar (DE)

(72) Inventors: Alexander Weiss, Linden (DE); Christian Schumann, Lich (DE); Ronja Capellmann, Wetzlar (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 502 days.

(21) Appl. No.: 17/285,103

(22) PCT Filed: Oct. 18, 2019

(86) PCT No.: PCT/EP2019/078326
§ 371 (c)(1),
(2) Date: Apr. 14, 2021

(87) PCT Pub. No.: WO2020/079208
PCT Pub. Date: Apr. 23, 2020

(65) Prior Publication Data
US 2021/0349298 A1  Nov. 11, 2021

(30) Foreign Application Priority Data
Oct. 19, 2018 (DE) .......................... 102018126009.1

(51) Int. Cl.
*G01B 11/06* (2006.01)
*G02B 21/02* (2006.01)
(Continued)

(52) U.S. Cl.
CPC .............. *G02B 21/34* (2013.01); *G01B 11/06* (2013.01); *G02B 21/02* (2013.01); *G02B 21/0088* (2013.01)

(58) Field of Classification Search
CPC .... G02B 21/34; G02B 21/02; G02B 21/0088; G02B 27/0068; G01B 11/06
See application file for complete search history.

(56) References Cited

U.S. PATENT DOCUMENTS

| 5,136,149 A * | 8/1992 | Fujiwara | .................. G02B 7/32 |
| | | | 369/44.32 |
| 7,088,448 B1 * | 8/2006 | Hahn | ........................ G01J 4/00 |
| | | | 356/369 |

(Continued)

FOREIGN PATENT DOCUMENTS

DE  102007043937 A1  3/2008
DE  102008018951 A1  10/2009
(Continued)

OTHER PUBLICATIONS

Kim, "Gap measurement by position-sensitive detectors", 2000, Applied Optics, vol. 39, No. 16, pp. 2584-2591 (Year: 2000).*
(Continued)

*Primary Examiner* — Michael A Lyons
*Assistant Examiner* — Judy Dao Tran
(74) *Attorney, Agent, or Firm* — Leydig, Voit & Mayer, Ltd.

(57) ABSTRACT

A method is useable for determining a thickness of a cover slip or object carrier in a microscope, which has an objective facing toward a sample chamber. Two optical media border two opposing surfaces of the cover slip or object carrier and form two partially reflective interfaces, which are arranged at different distances from the objective. The method includes: deflecting a measurement light beam by the objective with oblique incidence on the cover slip or object carrier; generating two reflection light beams spatially separated from one another by the measurement light beam being partially reflected on each of the two interfaces; receiving the two reflection light beams by the objective and conduct-
(Continued)

ing them onto a position-sensitive detector; registering the incidence locations on the position-sensitive detector; and determining the thickness of the cover slip or object carrier based on the registered incidence locations.

17 Claims, 6 Drawing Sheets

(51) Int. Cl.
*G02B 21/34* (2006.01)
*G02B 21/00* (2006.01)

(56) References Cited

U.S. PATENT DOCUMENTS

| 2008/0310016 | A1 | 12/2008 | Karasawa et al. |
| 2010/0171955 | A1* | 7/2010 | Suga ............... G01B 11/026 356/622 |
| 2011/0043905 | A1 | 2/2011 | Mitzkus et al. |
| 2011/0317260 | A1 | 12/2011 | Krueger |
| 2013/0094016 | A1* | 4/2013 | Knebel ............... G01M 11/02 356/124 |
| 2016/0028936 | A1* | 1/2016 | Saphier ............... G02B 7/32 348/87 |
| 2017/0013186 | A1 | 1/2017 | Norris et al. |

FOREIGN PATENT DOCUMENTS

| DE | 102010030430 A1 | 12/2011 |
| EP | 1 988 417 A1 | 11/2008 |
| WO | WO-2005022127 A2 * | 3/2005 ............. G01B 11/06 |

OTHER PUBLICATIONS

Kurt, Michael, "Die Wissenschaftliche und Angewandte Photographie, Band 10: Die Mikrophotographie [Scientific and Applied Photography, vol. 10: Micro-Photography]," Dec. 1957, p. 171, Springer-Verlag Wien, Austria.

Kurt, Michael, "Die Wissenschaftliche und Angewandte Photographie, Band 10: Die Mikrophotographie [Scientific and Applied Photography, vol. 10: Micro-Photography]," Dec. 1957, p. 172, Springer-Verlag Wien, Austria.

* cited by examiner

METHOD AND MICROSCOPE FOR DETERMINING THE THICKNESS OF A COVER SLIP OR SLIDE

CROSS-REFERENCE TO PRIOR APPLICATIONS

This application is a U.S. National Phase Application under 35 U.S.C. § 371 of International Application No. PCT/EP2019/078326, filed on Oct. 18, 2019, and claims benefit to German Patent Application No. DE 10 2018 126 009.1, filed on Oct. 19, 2018. The International Application was published in German on Apr. 23, 2020 as WO 2020/079208 under PCT Article 21(2).

FIELD

The invention relates to a method for determining the thickness of a cover slip or object carrier (e.g., a slide) in a microscope, which has an objective facing toward a sample chamber, wherein two optical media border two opposing surfaces of the cover slip or object carrier in the sample chamber and thus form two partially reflective interfaces, which are arranged at different distances from the objective. The invention furthermore relates to a microscope having a device for determining the thickness of a cover slip or object carrier.

BACKGROUND

In a microscope, the imaging of a sample is typically influenced by a cover slip with which the sample is covered. The sample is located in a sample chamber of the microscope, in which two optical media border the cover slip from opposing sides. These optical media are formed, for example, by an immersion medium which borders both the cover slip and also the microscope objective, and an embedding medium enclosing the sample, which borders the surface of the cover slip facing away from the objective.

In particular with regard to effective correction of imaging errors, it is important to know the thickness of the cover slip, since this determines the length of the optical path which the detection light to be registered by the objective passes through during the passage through the cover slip. Thus, above all the spherical aberration varies significantly as a function of the thickness of the cover slip. To take the thickness of the cover slip into consideration, it is therefore to be ascertained in a measurement separately provided for this purpose.

Such a thickness measurement is possible using a so-called scanning method, as described in M. Kurt, "Die wissenschaftliche und angewandte Photographie, Band 10: Die Mikrophotographie [scientific and applied photography, volume 10: micro-photography]," page 171. However, this scanning method has the disadvantage that the sample cannot yet be prepared under the cover slip and therefore does not come into consideration for an application inside the microscope itself.

A thickness measurement also carried out outside the microscope is possible with the aid of an interferometer. However, the use of an interferometer is linked to additional costs.

A measurement method in which the thickness of the cover slip is ascertained inside the microscope is known from M. Kurt, "Die wissenschaftliche und angewandte Photographie, Band 10: Die Mikrophotographie [scientific and applied photography, volume 10: micro-photography]," page 172. In this method, the front side and the rear side of the cover slip are alternately focused on by varying the distance between objective and cover slip accordingly. A so-called z-drive is used for this purpose, on which corresponding setting values may be read. The optical thickness of the cover slip may be determined by means of the difference of the read-off setting values. The mechanical thickness of the cover slip can then be calculated on the basis of the ascertained optical thickness by means of a correction factor, which was experimentally obtained on other cover slips.

One disadvantage of the above-described measurement method is that the operator has to focus on the interfaces which are formed by the front side and the rear side of the cover slip. In particular in the case of clean interfaces, such focusing is difficult. An automation of this method is also not possible, since the focusing on the interfaces has to be carried out using an image-based autofocus method and such an autofocus method is not capable of finding the low-contrast interfaces of the cover slip, in particular of its front side against the background of a higher-contrast sample. Moreover, the conversion provided in this previously known method from the optical thickness to the mechanical thickness by means of an experimentally ascertained correction factor is complex and cumbersome. In particular, it has to be carried out individually for each objective. An analytical solution of this conversion would therefore be preferable.

SUMMARY

In an embodiment, the present invention provides a method for determining a thickness of a cover slip or object carrier in a microscope, which has an objective facing toward a sample chamber. Two optical media border two opposing surfaces of the cover slip or object carrier in the sample chamber and form two partially reflective interfaces, which are arranged at different distances from the objective. The method includes: deflecting a measurement light beam by the objective with oblique incidence on the cover slip or object carrier; generating two reflection light beams spatially separated from one another by the measurement light beam being partially reflected on each of the two partially reflective interfaces; receiving the two reflection light beams by the objective and conducting the two reflection light beams onto a position-sensitive detector; registering the incidence locations of the two reflection light beams on the position-sensitive detector; and determining the thickness of the cover slip or object carrier based on the registered incidence locations of the two reflection light beams.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

Figure 1:
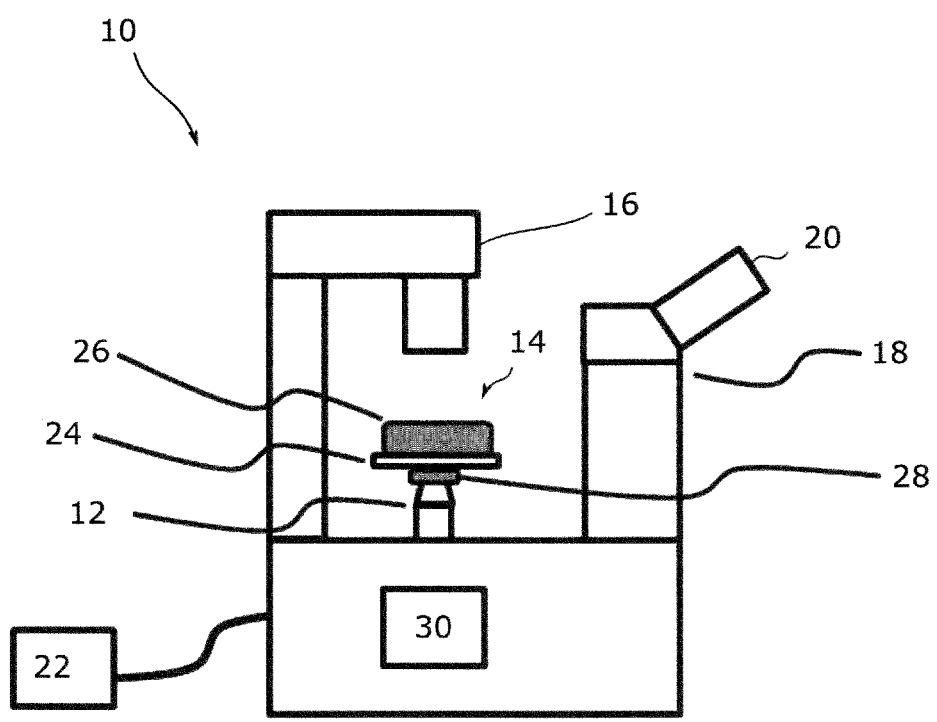
FIG. 1 shows a schematic illustration of an inverse transmitted light microscope as a first exemplary embodiment.

Embodiments of the invention provide a method and a microscope which enable simple and precise determination of the thickness of a cover slip or object carrier.

The method according to an embodiment of the invention is used to determine the thickness of a cover slip or object carrier in a microscope, which has an objective facing toward a sample chamber, wherein two optical media border two opposing surfaces of the cover slip or object carrier in the sample chamber and thus form two partially reflective interfaces which are arranged at different distances from the objective. In the method, a measurement light beam is deflected through the objective with oblique incidence on the cover slip or object carrier. Two reflection beams spatially separated from one another are generated in that the measurement light beam is partially reflected on each of the two interfaces. The two reflection light beams are received by the objective and deflected onto a position-sensitive detector. The incidence locations of the two reflection beams on the position-sensitive detector are registered. The thickness of the cover slip or object carrier is ascertained on the basis of the registered incidence locations of the two reflection beams.

A cover slip or object carrier is understood in this application in particular as a cover slip covering a sample, a slide, a bottom of a petri dish, or a bottom of a well of a microtitration plate.

In the method according to an embodiment of the invention, the ascertained thickness of the cover slip or object carrier is given by the distance of the two partially reflective interfaces along the optical axis. To determine this distance, the method uses the two partial reflections which the measurement light beam deflected under oblique incidence on the cover slip or object carrier experiences on the two interfaces, which are formed by the opposing surfaces of the cover slip or object carrier and the optical media adjoining thereon. Since the index of refraction of the cover slip or object carrier differs from the indices of refraction of the two optical media bordering it, a jump in the index of refraction occurs at each of the two interfaces, which results in the partial reflections used according to an embodiment of the invention. Since the two interfaces are spaced apart from one another and the measurement light beam is incident obliquely on the interfaces with respect to the optical axis of the objective, a spatial separation of the two reflection light beams resulting on the interfaces takes place. This spatial separation is reflected in the incidence locations at which the two reflection light beams are incident on the position-sensitive detector. The registered incidence locations of the reflection beams are thus uniquely correlated with the distance which the two partially reflective interfaces have along the optical axis of the objective, which is used for the thickness measurement according to an embodiment of the invention.

It is to be noted here that in the method according to an embodiment of the invention, the one of the two reflection light beams which results on the interface facing away from the objective firstly passes through the cover slip or object carrier itself and is then refracted on the interface which it then passes through and which faces toward the objective, before it enters the objective. This results in a focus shift, which means that the optical thickness of the cover slip or object carrier is determined.

In one special embodiment of the invention, the two reflection light beams are deflected simultaneously onto the position-sensitive detector, and the thickness of the cover slip or object carrier is ascertained by means of the mutual distance of the different incidence locations of the two reflection beams. This embodiment is designed in particular for cover slips or object carriers which are relatively thin with respect to the objective enlargement. This is because in this case the spatial separation of the two reflection beams is accordingly minor, so that both may be registered simultaneously on the position-sensitive detector.

In an alternative embodiment, the two reflection light beams are conducted in succession onto the position-sensitive detector. This means that at a given point in time only one of the reflection light beams is registered in each case on the position-sensitive detector. Such an embodiment is designed in particular for cover slips or object carriers which are comparatively thick with respect to the objective enlargement. In this case, the mutual distance of the two interfaces at which the reflection light beams result is sufficient that the accompanying spatial separation of the reflection light beams makes it impossible to receive both reflection light beams simultaneously on the position-sensitive detector.

If the two reflection light beams are conducted in succession onto the position-sensitive detector, it is thus provided, for example, that the incidence location of the first reflection light beam conducted onto the position-sensitive detector is registered, subsequently an operating parameter of the microscope is adjusted so that the incidence location of the reflection light beam subsequently conducted onto the position-sensitive detector corresponds to the previously registered incidence location, and then the thickness of the cover slip or object carrier is ascertained by means of the operating parameter.

In the above-mentioned embodiment, the distance between the cover slip or object carrier and the objective is preferably set as the operating parameter. This distance measured along the optical axis of the objective can be changed, for example, via a suitable adjustment device, such as a so-called z-drive. In this case, two adjustment values of the z-drive result, from the difference of which the optical thickness of the cover slip or object carrier may be ascertained.

Alternatively, the position of a displaceable focusing lens provided in the microscope can be adjusted as the operating parameter. The optical thickness of the cover slip or object carrier can then be ascertained from the position change of this displaceable focusing lens in consideration of the optical imaging conditions.

In one preferred embodiment, by means of the optical thickness, a mechanical thickness of the cover slip or object carrier is ascertained in consideration of the indices of refraction of the cover slip or object carrier and the optical medium, which adjoins both the objective and also the cover slip or object carrier. The above-mentioned optical medium is, for example, an immersion medium which is located between the cover slip or object carrier and the objective. If the indices of refraction of the cover slip or object carrier and the immersion medium are known, the mechanical thickness of the cover slip or object carrier may thus be calculated on the basis of the previously ascertained optical thickness according to the following equation:

$$d_{mech.} = d_{opt.} \cdot \frac{n_g}{n_{im}} \quad (1)$$

in which $d_{mech}$ denotes the mechanical thickness, $d_{opt}$ denotes the optical thickness, $n_g$ denotes the index of refraction of the cover slip or object carrier, and $n_{im}$ denotes the index of refraction of the immersion medium.

If the mechanical thickness of the cover slip or object carrier is to be ascertained particularly precisely, the numerical aperture of the measurement light beam is thus taken into consideration in addition. This is preferably carried out according to the following equation:

$$d_{mech.} = d_{opt.} \cdot \sqrt{\frac{n_g^2 - NA^2}{n_{im}^2 - NA^2}} \quad (2)$$

in which NA denotes the numerical aperture of the measurement light beam.

The numerical aperture NA is given by the product of the index of refraction $n_{im}$ of the immersion medium and the angle of incidence at which the measurement light beam exiting from the objective is incident on the cover slip or object carrier in relation to the optical axis. Moreover, the typical imaging errors can be taken into consideration in the calculation of the mechanical thickness.

In a further advantageous embodiment, it is provided that a measurement pattern is generated by each of the measurement light beams at the two interfaces, and the two measurement patterns are imaged by the two reflection light beams on the position-sensitive detector. It is thus possible, for example, to generate the respective measurement pattern in the form of an image of a slit diaphragm, which is part of the light source emitting the measurement light beam or is arranged in front of it.

The respective measurement pattern imaged on the position-sensitive detector is preferably registered in the form of a spatial intensity distribution, from which the incidence location of the associated reflection light beam is determined. If the measurement patterns imaged on the position-sensitive detector are given, for example, by the images of a slit diaphragm, the above-mentioned intensity distribution is thus obtained by integrating the respective diaphragm image on the detector over a direction which is parallel to the longitudinal alignment of the slit diaphragm. The location of the respective diaphragm image registered on the detector, which is dependent on the distance between the associated partially reflective interface and the objective, is reflected in this case by a peak occurring in the intensity distribution. The location of the diaphragm image may thus be ascertained easily from the location of the associated peak. To register the location of the diaphragm image even more accurately, suitable algorithms can be applied, for example, the adaptation of a suitable curve shape, such as a Gaussian curve, to the peak occurring in the intensity distribution.

The measurement light beam is preferably conducted into a section of an entry pupil of the objective which is offset in relation to the center of the entry pupil. In this way, the entry pupil of the objective is backlit in a decentralized manner by the measurement light beam, whereby the measurement light beam is inclined obliquely to its optical axis upon the exit from the objective. This decentralized backlighting of the entry pupil thus enables the desired spatial separation of the reflection light beams generated at the two interfaces in a particularly simple manner. The reflection light beams are then preferably conducted back into the objective so that they penetrate a different section of the entry pupil, which is offset in relation to the above-mentioned section of the entry pupil, in the direction opposite to the propagation direction of the measurement light beam.

The microscope according to an embodiment of the invention comprises a sample chamber having a transparent cover slip or object carrier and two optical media, an objective facing toward the sample chamber, two partially reflective interfaces, which are arranged in the sample chamber at different distances from the objective and are formed in that the two optical media border two opposing surfaces of the cover slip or object carrier in the sample chamber, and a device for determining the thickness of the cover slip or object carrier. The above-mentioned device is designed to deflect a measurement light beam through the objective with oblique incidence on the cover slip or object carrier. The device is furthermore designed to generate two reflection light beams spatially separated from one another, in that the measurement light beam is partially reflected at each of the two interfaces. The device has a position-sensitive detector and is designed to receive the two reflection light beams through the objective and conduct them to the position-sensitive detector. The position-sensitive detector is designed to register the incidence locations of the two reflection light beams. The device comprises an ascertainment unit which is designed to ascertain the thickness of the cover slip or object carrier on the basis of the registered incidence locations of the two reflection light beams.

The device preferably has an aperture diaphragm having a diaphragm opening, which is arranged in a decentered manner at a distance to the optical axis of the objective. The aperture diaphragm delimits the cross section of the measurement light beam in such a way that the latter backlights the entry pupil of the objective in a decentralized manner and thus exits obliquely to the optical axis from the objective. In this way, it is ensured that the reflection light beams generated at the two partially reflective interfaces are conducted spatially separated from one another back into the objective and can ultimately be registered on the position-sensitive detector at different incidence locations. The decentralized backlighting of the entry pupil of the objective furthermore has the advantage that axis-proximal beam components are avoided, which cause so-called first-order reflections, which arise most strongly at the surface vertices of the lenses forming the objective and worsen the signal-to-noise ratio.

In one preferred embodiment, the device has a light source which emits the measurement light beam in the infrared wavelength range. This has the advantage that the measurement patterns generated by the measurement light beam on the cover slip or object carrier are not visible to the human eye and thus do not interfere with the observation of the sample through the microscope. However, it is also possible to use a measurement light beam in the visible wavelength range.

The position-sensitive detector is preferably a line detector, which is aligned so that it can register the intensity distribution of the two reflection light beams, which the two images of the measurement pattern reflect, in their entirety. In this case, it is possible to register the two reflection light beams simultaneously on the detector and ascertain the thickness of the cover slip or object carrier from the distance which the incidence locations have from one another. However, the position-sensitive detector can also be embodied as a surface detector, for example as a two-dimensional CCD camera.

The opposing surfaces of the cover slip or object carrier are preferably aligned plane-parallel to one another.

The device according to an embodiment of the invention is also suitable because of its above-described structural and functional properties to be used in the microscope as an autofocus device. Moreover, the device offers the option because of its properties of also determining other variables influencing the light-microscopy imaging, in addition to the thickness of the cover slip or object carrier, for example the index of refraction of the embedding medium and/or the tilt of the cover slip or object carrier.

Embodiments of the invention are applicable to a variety of microscope types, for example inverse or upright transmitted light microscopes.

FIG. 1 shows a microscope 10 as a first exemplary embodiment, on which the thickness determination according to the invention is applicable.

The microscope 10 is embodied as an inverse transmitted light microscope. It accordingly comprises an objective 12, which faces from below toward a sample chamber identified by 14 in FIG. 1, and a light source 16, which is oriented from above on the sample chamber 14. The microscope 10 furthermore has a tube 18 having an eyepiece 20, through which an operator can observe a sample image received by the objective 12. Moreover, a control unit 22 is provided, which activates the various microscope components.

A cover slip 24 for covering a sample is located in the sample chamber 14 of the microscope 10. An optical medium 26, in which the sample is embedded and which is referred to hereinafter as the embedding medium, is arranged on the cover slip 24. Furthermore, an immersion medium 28 is arranged in the sample chamber 14, which borders the objective 12 from above and the cover slip 24 from below in FIG. 1.

The microscope 10 furthermore has a device identified in general by the reference sign 30 in FIG. 1, which is used to ascertain the thickness of the cover slip 24. The device 30 is shown in greater detail in FIG. 2.

Figure 2:
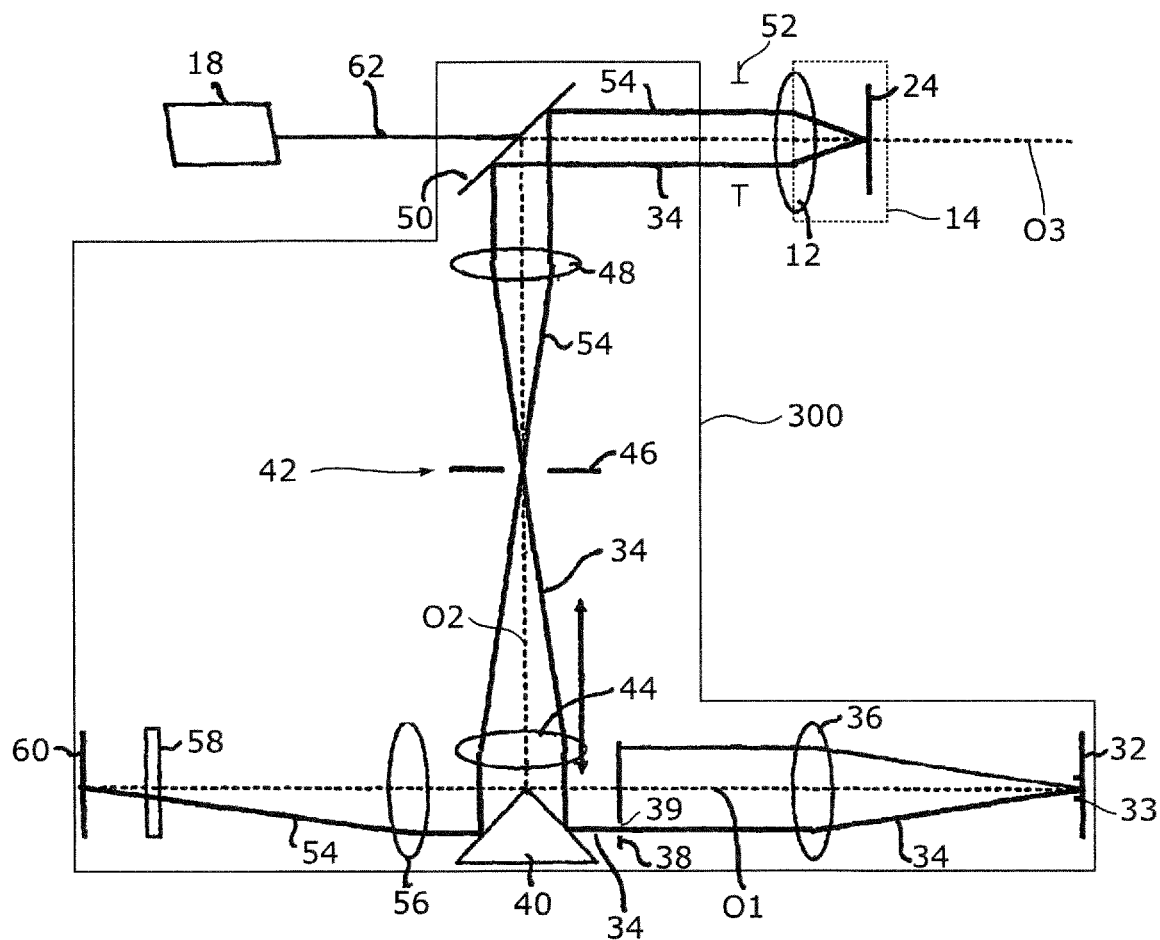
FIG. 2 shows a device for determining the thickness of a cover slip or object carrier according to an embodiment of the invention, which is part of the microscope according to FIG. 1.

As shown in FIG. 2, the device 30 has a light source 32, which emits a measurement light beam 34 in the infrared wavelength range. The light source 32 is, for example, an LED, which has a slit diaphragm 33, by which the measurement light beam 34 is oriented on an illumination optical unit 36. After passing through the illumination optical unit 36, the measurement light beam 34 is incident on an aperture diaphragm 38, which is positioned centrally on the optical axis O1 of the illumination optical unit 36, but has a diaphragm opening 39, which is arranged decentered at a distance to the optical axis O1 of the illumination optical unit 36. The diaphragm opening 39 of the aperture diaphragm 38 delimits the beam cross section of the measurement light beam 34 in such a way that only the part of measurement light beam 34 located below the optical axis O1 of the illumination optical unit 36 in FIG. 2 passes the aperture diaphragm in the direction of a deflection prism 40.

The measurement light beam 34 delimited in its beam cross section is reflected at the deflection prism 40 into a transport optical unit 42, which is formed from a focusing lens 44 displaceable along its optical axis O2, a scattered light diaphragm 46, and a further lens 48. After passing through the transport optical unit 42, the measurement light beam 34 is incident on a dichroic beam splitter 50, which reflects light in the infrared wavelength range, while it transmits light in the visible range. The measurement light beam 34 is reflected in the direction of the objective 12 by the dichroic mirror 50. The measurement light beam 34 reflected on the dichroic mirror 50 extends here with a parallel offset to the optical axis O3 of the objective 12. In this way, the measurement light beam 34 is conducted into a section of an entry pupil 52 of the objective 12, which is laterally offset in relation to the optical axis O3 of the objective 12 and thus in relation to the center of the entry pupil 52 (cf. FIG. 3). The entry pupil 52 of the objective 12 is thus backlit in a decentralized manner, which has the result that the measurement light beam 34 is deflected into the sample chamber 14 at an angle α obliquely to the optical axis O3.

For the sake of simplicity, the embedding medium 26 and the immersion medium 28, which border the cover slip 24 in the sample chamber 14 from opposite sides, are omitted in the illustration according to FIG. 2. The measurement light beam 34 conducted with oblique incidence into the sample chamber 14 is reflected on the cover slip 24, as is explained in greater detail below with reference to FIG. 3, whereby two reflection beams conducted back into the objective 12 result, which are shown in the schematic view according to FIG. 2 (in contrast to the detail view according to FIG. 3) in the form of a single light beam denoted by 54.

After passing through the objective 12, the two reflection light beams 54 are incident on the dichroic mirror 50, which deflects the reflection light beams 54 into the transport optical unit 42. After passing the transport optical unit 42, the reflection light beams 54 are incident on the deflection prism 40, which reflects the reflection light beams 54 on a detector optical unit 56. The detector optical unit 56 orients the reflection light beams 54 on a spectral filter 58, which is only transmissive for light in the infrared wavelength range and blocks scattered light outside this wavelength range. The reflection light beams 54 transmitted through the spectral filter 58 are finally incident on a position-sensitive detector 60, which is capable of registering the intensities of the reflection light beams 54 in a location-resolved manner.

For the sake of completeness, the coupling of the tube 18 to the device 30 implemented via the dichroic mirror 50 is also illustrated in FIG. 2. The dichroic mirror 50 is accordingly also used in the present exemplary embodiment to supply the visible detection light 62, which is used for the actual microscopic imaging, and which the objective 12 conducts out of the sample chamber 14 in the direction of the dichroic mirror 50, by transmission to the tube 18.

Figure 3:
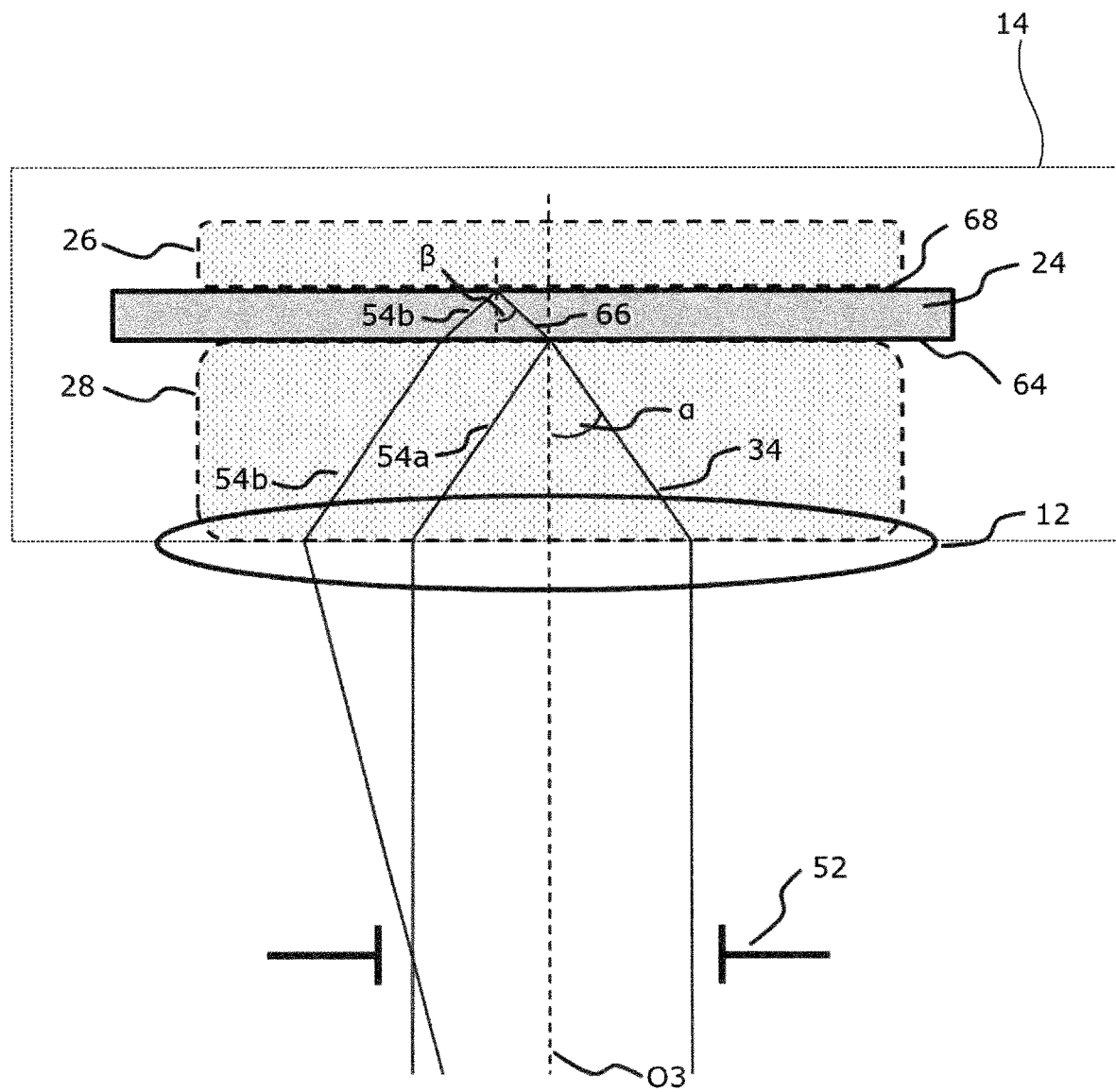
FIG. 3 shows a schematic illustration, which shows a sample chamber of the microscope according to FIG. 1.

FIG. 3 shows in greater detail how the two reflection light beams (denoted by 54a and 54b in FIG. 3) are generated by reflection of the measurement light beam, which are used according to the invention for determining the thickness of the cover slip 24. Accordingly, the measurement light beam 34 backlighting the entry pupil 52 of the objective 12 in a decentralized manner is deflected by the objective 12 at an angle α obliquely to the optical axis O3 onto the front face of the cover slip 24, which faces toward the objective 12 and is denoted by 64 in FIG. 3. Since the cover slip 24 and the immersion medium 28 bordering its front face 64 have different indices of refraction, the front face 64 of the cover slip 24 and the immersion medium 28 adjoining thereon form a first interface, at which the incident measurement light beam 34 is partially reflected. The part of the measurement light beam reflected at this first interface generates the first reflection light beam 54a, which is conducted back into the objective 12.

The other part 66 of the measurement light beam 34, which the first interface transmits, is diffracted away from the optical axis O3 of the objective 12 upon entry into the cover slip 24 and encloses an angle β with this axis, which is greater than the angle α. This transmitted part 66 of the measurement light beam 34 is partially reflected at a second interface, which is defined by the rear face 68 of the cover slip 24 and the embedding medium 26 adjoining thereon, which has a different index of refraction than the cover slip 24. The second reflection light beam 54b is generated by this second partial reflection of the measurement light beam 34 on the second interface, which passes through the front face 64 of the cover slip 24 and then arrives back in the objective 12.

As shown in the illustration according to FIG. 3, the oblique incidence of the measurement light beam 34 in the sample chamber 14 ensures that the reflection light beams 54a, 54b generated by the two partial reflections on the front face 64 and the rear face 68, respectively, of the cover slip 24 arrive back in the objective 12 on different optical paths. In this way, the two reflection light beams 54a, 54b are incident at different incidence locations on the position-sensitive detector 60, if it is ensured that both reflection light beams 54a, 54b are incident simultaneously on the detector 60. In other words, the two measurement patterns generated in the form of the slit images at the front face 64 or the rear face 68, respectively, of the cover slip 24 are imaged spatially separated from one another on the position-sensitive detector 60, as illustrated in the diagram according to FIG. 4.

Figure 4:
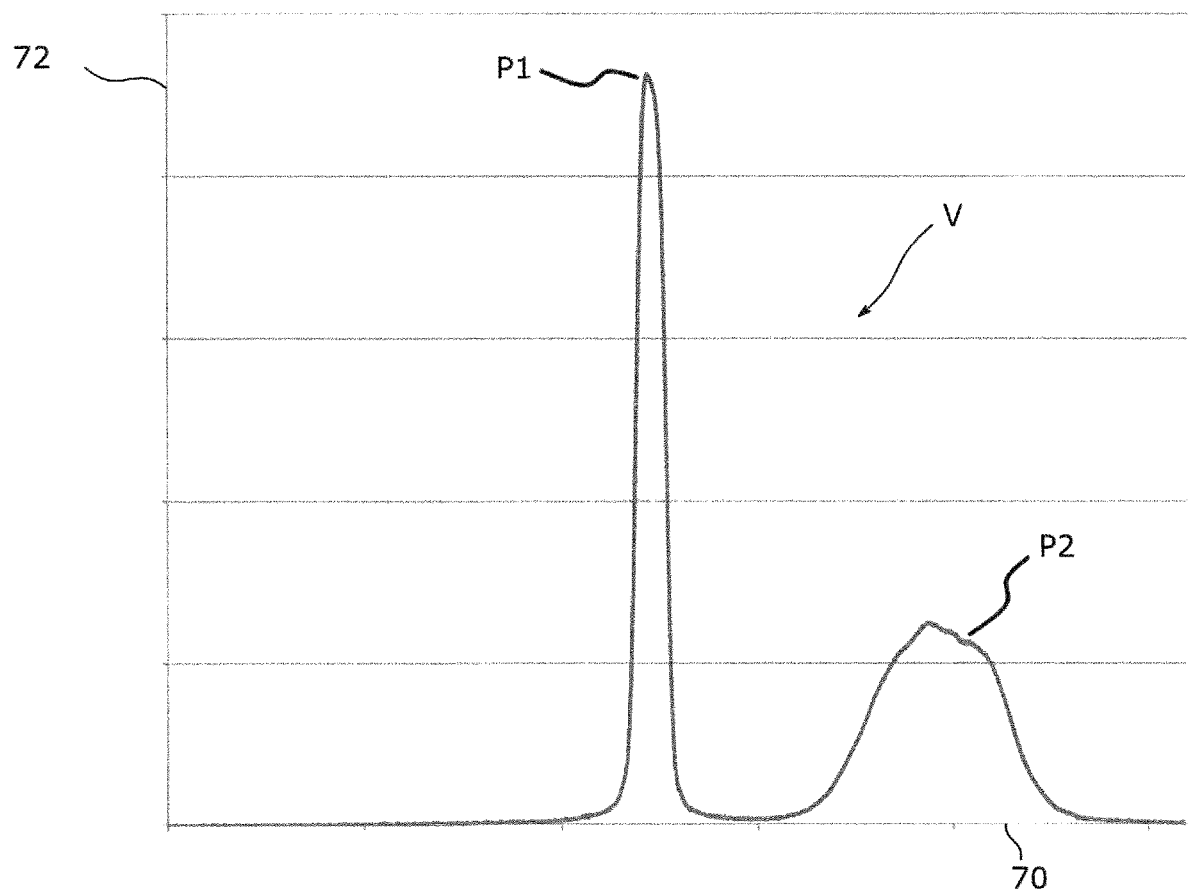
FIG. 4 shows an intensity distribution registered by a position-sensitive detector of the device according to FIG. 2.

FIG. 4 shows an exemplary intensity distribution V, which the two reflection light beams 54a, 54b jointly generate on the position-sensitive detector 60. The abscissa 70 of the diagram reflects the incidence location on the detector 60 and the ordinate 72 reflects the intensity measured at the respective incidence location. The intensity distribution V according to FIG. 4 shows two peaks, of which the peak denoted by P1 is associated with the first reflection light beam 54a and the peak denoted by P2 is associated with the second reflection light beam 54b. It may be seen from the fact that the peak P1 is taller and sharper than the peak P2 that in the example according to FIG. 3, the measurement light beam 34 is focused on the front face 64 of the cover slip 24. This means that a focused image of the slit diaphragm 33 of the light source 32 is generated on the front face 64 of the cover slip 24, while an image of the slit diaphragm 33 defocused in relation thereto results on the rear face 68 of the cover slip 24. This corresponds to the illustration according to FIG. 3 insofar as the first partial reflection takes place on the front surface 64 of the cover slip 24 at a point which is centered on the optical axis O3 of the objective 12. In contrast, the second partial reflection takes place on the rear face 38 of the cover slip 24 at a point offset thereto transversely to the optical axis O3. The areas below the peaks P1, P2 shown in FIG. 4 are each a measure of the intensity of the respective reflection light beam 54a, 54b.

A situation is shown in the example according to FIG. 4, in which the two reflection light beams 54a, 54b are incident simultaneously on the position-sensitive detector 60. This means that the spatial splitting of the two reflection light beams 54a, 54b, which corresponds to the thickness of the cover slip 24, is comparatively minor. In other words, in the example according to FIG. 4, the thickness to be registered of the cover slip 24 is relatively minor in relation to the objective enlargement. However, a situation is also conceivable in which the spatial splitting of the reflection light beams 54a, 54b corresponding to the thickness to be registered of the cover slip 24 is sufficient that a simultaneous registration of the two reflection light beams 54a, 54b by the position-sensitive detector 60 is not possible. Therefore, an embodiment of the method according to the invention is explained hereinafter with reference to the flow chart according to FIG. 5, in which the two above-mentioned situations are taken into consideration.

Figure 5:
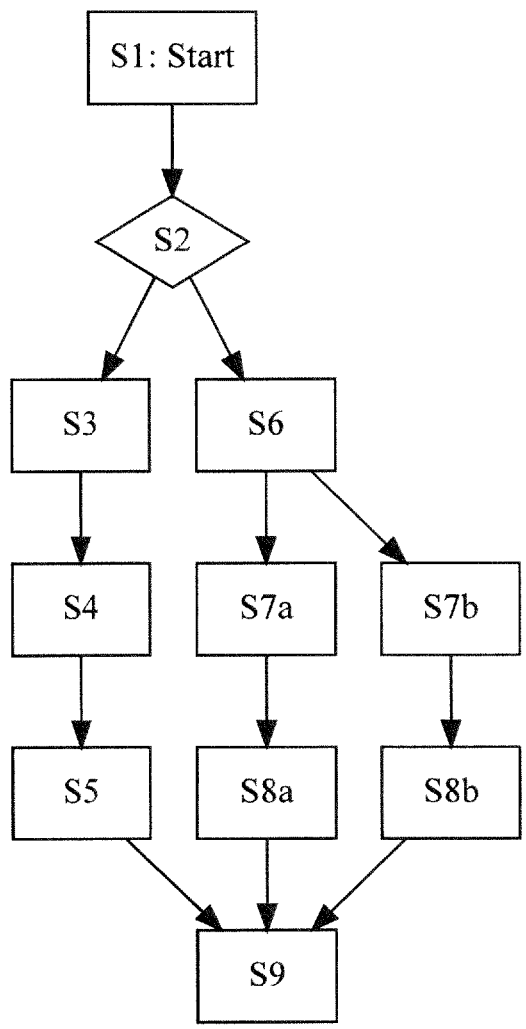
FIG. 5 shows a flow chart which shows a special embodiment of the method according to the invention for determining the thickness of the cover slip or object carrier.

The starting point of the method according to FIG. 5 is that at least one of the two reflection light beams 54a, 54b, i.e., at least one of the two slit images, is registered on the position-sensitive detector 60. This may be achieved by adjusting a suitable operating parameter. For example, the distance between the objective 12 and the cover slip 24 can be reduced starting from a maximum value by means of a positioning device, such as a z-drive, until a first of the two slit images is registered in a suitable starting position on the position-sensitive detector. Alternatively, the position of the focusing lens 44 contained in the transport optical unit 42 can be adjusted accordingly. A suitable starting position is given, for example, by an incidence location at which the first slit image can be completely registered on the detector 60, but is located as close as possible to the edge of the active registration region of the detector 60. It is thus ensured that as much space as possible is provided on the detector 60 for the second slit image to be expected. This starting point corresponds to step S1 in the flow chart according to FIG. 5.

In step S2, the number of the slit images registered simultaneously on the detector 60 is ascertained. If two slit images are registered in step S2, i.e., the second slit image in addition to the first slit image set in step S1, the method thus branches to step sequence S3 to S5, in which no further setting of the above-mentioned operating parameter is necessary. In contrast, if only the first slit image is registered in step S2, an adjustment of the operating parameter is thus to be performed, and the sequence continues—depending on the selection of the operating parameter—either with step sequence S6, S7a, S8a or with step sequence S6, S7b, S8b.

In step sequence S3 to S5, in S3, first the location of the first slit image on the detector 60 is determined. In step S4, the location of the second slit image on the detector is then determined. In step S5, the distance of the two slit images is then ascertained and the optical thickness of the cover slip 24 is calculated on the basis of this distance in consideration of the optical imaging conditions.

In step S6, the location of the first slit image on the detector 60 is also determined first. In step S7a, the presently selected operating parameter is then varied, i.e., the distance between the cover slip 24 and the objective 12 is changed by activating the z-drive along the optical axis O3 until the second slit image is registered in the starting position defined in step S2. Subsequently, in step S8a, the optical thickness of the cover slip 24 is then ascertained on the basis of the difference of the adjustment values of the z-drive.

In contrast, if the position of the focusing lens 44 represents the operating parameter to be varied, in step S7b, this position is changed until the second slit image is registered in the starting position defined in step S2. Subsequently, the optical thickness of the cover slip 24 is then ascertained in step S8b by means of the difference of the setting values of the positions of the focusing lens 44 in consideration of the optical imaging conditions.

In step S9, the mechanical thickness of the cover slip is finally analytically calculated from the optical thickness of the cover slip, which has been ascertained in step S5, step S8a, or step S8b, according to one of the two equations (1) or (2) indicated above.

Figure 6:
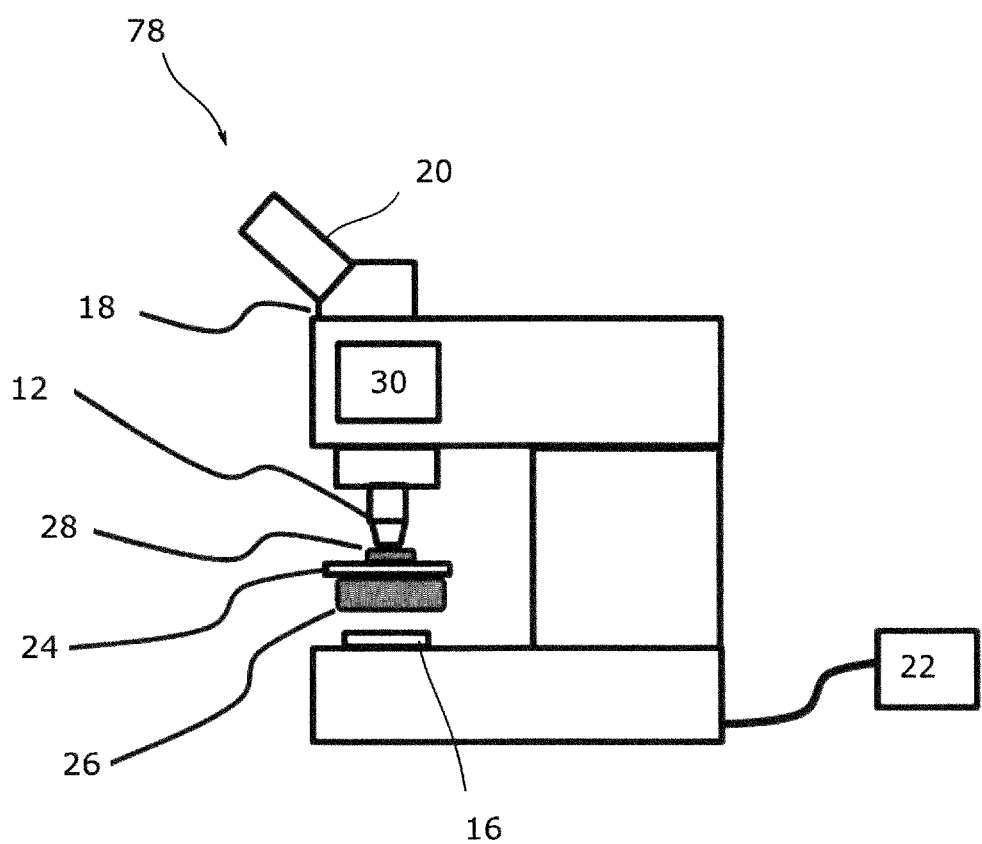
FIG. 6 shows a schematic illustration of an upright transmitted light microscope, which forms a second exemplary embodiment of the microscope according to the invention.

FIG. 6 shows a microscope 78, which in contrast to the microscope 10 shown in FIG. 1 is embodied as an upright transmitted light microscope. The microscope components which correspond to the components of the microscope 10 according to FIG. 1 are provided in FIG. 7 with the reference signs already used in FIG. 1.

In contrast to the embodiment according to FIG. 1, in the microscope shown in FIG. 7, the objective 12 is arranged above the sample chamber 18, while the light source 16 is located below the sample chamber 18. The immersion medium 28, which borders the objective 12, on the one hand, and the cover slip 24, on the other hand, is accordingly located above the cover slip 24, while the embedding medium 26 is arranged below the cover slip 24.

The cover slip thickness is determined according to the invention in the microscope 78 according to FIG. 7 in the same way as in the microscope 10 shown in FIG. 1.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS 10 microscope
12 objective
14 sample chamber
16 light source
18 tube
20 eyepiece
22 control unit
24 cover slip
26, 28 optical medium
30 device
32 light source
33 slit diaphragm
34 measurement light beam
36 illumination optical unit
38 aperture diaphragm
39 diaphragm opening
40 deflection prism
42 transport optical unit
44 focusing lens
46 scattered light diaphragm
50 beam splitter
52 entry pupil
54, 54a, 54b reflection light beam
56 detector optical unit
58 spectral filter
60 detector
62 imaging beam path
64, 68 surface
66 transmitted measurement light beam
70 abscissa
72 ordinate
O1, O2, O3 optical axis
P1, P2 peak
V intensity distribution
α, β angle

The invention claimed is:

1. A method for determining a thickness of a cover slip or object carrier in a microscope, which has an objective facing toward a sample chamber, wherein two optical media border two opposing surfaces of the cover slip or object carrier in the sample chamber and form two partially reflective interfaces, which are arranged at different distances from the objective, the method comprising:
    deflecting a measurement light beam by the objective with oblique incidence on the cover slip or object carrier;
    generating two reflection light beams spatially separated from one another by the measurement light beam being partially reflected on each of the two partially reflective interfaces;
    receiving the two reflection light beams by the objective and conducting the two reflection light beams onto a position-sensitive detector;
    registering the incidence locations of the two reflection light beams on the position-sensitive detector; and
    determining the thickness of the cover slip or object carrier based on the registered incidence locations of the two reflection light beams.

2. The method as claimed in claim 1, wherein the two reflection light beams are conducted simultaneously onto the position-sensitive detector and the thickness of the cover slip or object carrier is determined by the mutual distance of the different incidence locations of the two reflection light beams.

3. The method as claimed in claim 1, wherein the two reflection light beams are conducted in succession onto the position-sensitive detector.

4. The method as claimed in claim 3, wherein the incidence location of the reflection light beam conducted first onto the position-sensitive detector is registered, then an operating parameter of the microscope is adjusted so that the incidence location of the reflection light beam conducted subsequently onto the position-sensitive detector corresponds to the previously registered incidence location, and then the thickness of the cover slip or object carrier is determined by the operating parameter.

5. The method as claimed in claim 4, wherein the distance between the cover slip or object carrier and the objective is set as the operating parameter.

6. The method as claimed in claim 4, wherein a position of a displaceable focusing lens provided in the microscope is set as the operating parameter.

7. The method as claimed in claim 1, wherein the determined thickness of the cover slip or object carrier corresponds to an optical thickness.

8. The method as claimed in claim 7, wherein a mechanical thickness of the cover slip or object carrier is ascertained by the optical thickness in consideration of indices of refraction of the cover slip or object carrier and of the optical medium which borders both the objective and the cover slip or object carrier.

9. The method as claimed in claim 8, wherein the mechanical thickness of the cover slip or object carrier is additionally determined in consideration of a numeric aperture of the measurement light beam.

10. The method as claimed in claim 1, wherein a measurement pattern is generated by the measurement light beam at each of the two interfaces, which is imaged by the associated reflection light beam on the position-sensitive detector.

11. The method as claimed in claim 10, wherein the respective measurement pattern imaged on the position-sensitive detector is registered in the form of a spatial intensity distribution, from which the incidence location of the associated reflection light beam is determined.

12. The method as claimed in claim 1, wherein the measurement light beam is conducted into a section of an entry pupil of the objective which is offset in relation to the center of the entry pupil.

13. A microscope, comprising:
a sample chamber having a cover slip or object carrier and two optical media;
an objective facing toward the sample chamber;
two partially reflective interfaces, which are arranged in the sample chamber at different distances from the objective and formed such that the two optical media in the sample chamber border two opposing surfaces of the cover slip or object carrier; and
a device having a position-sensitive detector, the device being configured to determine a thickness of the cover slip or object carrier by:
deflecting a measurement light beam through the objective with oblique incidence on the cover slip or object carrier;
generating two reflection light beams spatially separated from one another by the measurement light beam being partially reflected at each of the two partially reflective interfaces;
receiving the two reflection light beams through the objective and conducting the two reflection light beams onto the position-sensitive detector;
registering, by the position-sensitive detector, the incidence locations of the two reflection light beams; and
determining the thickness of the cover slip or object carrier based on the registered incidence locations of the two reflection light beams.

14. The microscope as claimed in claim 13, wherein the device has an aperture diaphragm having a diaphragm opening, which is arranged decentered at a distance to an optical axis of the objective.

15. The microscope as claimed in claim 13, wherein the device has a light source, which emits the measurement light beam in an infrared wavelength range.

16. The microscope as claimed in claim 13, wherein the position-sensitive detector is a two-dimensional detector.

17. The microscope as claimed in claim 13, wherein the position-sensitive detector is a one-dimensional detector.

* * * * *